United States Patent [19]

Kikuchi et al.

[11] 4,347,519

[45] Aug. 31, 1982

[54] INK JET PRINTER

[75] Inventors: Masatsugu Kikuchi; Masayoshi Tamai, both of Ebina, Japan

[73] Assignee: Fuji Xerox Co., Ltd., Tokyo, Japan

[21] Appl. No.: 177,045

[22] Filed: Aug. 11, 1980

[30] Foreign Application Priority Data

Aug. 23, 1979 [JP] Japan ................................ 54-106655

[51] Int. Cl.[3] ............................................ G01D 15/18

[52] U.S. Cl. .................................. 346/75; 346/140 R

[58] Field of Search .............................. 346/75, 140 IJ

[56] References Cited

U.S. PATENT DOCUMENTS 3,769,625 10/1973 Gunn ................................ 346/75 X 4,027,308 5/1977 Fan et al. .......................... 346/75 X

*Primary Examiner*—George H. Miller, Jr.

*Attorney, Agent, or Firm*—Sughrue, Mion, Zinn, Macpeak and Seas

[57] ABSTRACT

An ink jet printer in which ink particles separated from an ink jet at positions shifted from the normal charging electrode position are maintained charged at all times thereby preventing the separated particles from reaching the recording medium and being displaced thereon as moise. Auxiliary charging electrodes are provided adjacent the charging electrodes which control the charging of the ink particles according to a printing signal. The auxiliary charging electrodes can be provided as first and second sets of electrodes disposed on either side of the charging electrodes or as a continuous set of plates running from a position near the nozzles past the charging electrodes.

3 Claims, 4 Drawing Figures

"PRIOR ART"

INK JET PRINTER

BACKGROUND OF THE INVENTION

The present invention relates to a charge type deflecting device for a charging binary type multi-nozzle ink jet printer.

In an ink jet printer of the general type to which the invention pertains, ink particles not used for printing are charged so that they can be deflected perpendicularly to the primary direction of the ink jet by application of a deflecting field formed by deflecting electrodes. The deflected particles are recovered in a gutter. As the ink particles used for printing are not charged, they pass straight through the deflecting field to strike against the recording medium to print a desired image as a pattern of dots.

FIG. 1 is a schematic diagram showing the essential components of a conventional ink jet printer including therein nozzles 3, a charging electrode plate 4, ink jet passing holes 4A formed in the plate 4, a charging electrode 5 formed on the inner wall of each hole 4A, an upper deflecting electrode 6, a lower deflecting electrode 7, a gutter 8, a recording medium 9, a deflecting electrode DC source 11, and a printing signal generator 12.

In the conventional ink jet printer, the charging electrode plate 4 is prepared by forming a plurality of ink jet passing holes 4A in a single insulating plate made of a ceramic material or the like and by coating the inner walls of the holes 4A with electrically conductive material. The nozzles 3 are formed as a plurality of minute holes arranged linearly in an orifice panel. The ink jet from each nozzle 3 is separated at a certain position into ink particles or droplets. However, it should be noted that the ink jet separating position is different for different nozzles 3.

The distance between the end of the nozzle and the ink jet separating position, termed the "separating length", depends on various conditions although the distance is usually 0.5 mm to 2 or 3 mm. In a practical ink jet printer, the variation in the ink jet separating positions is selected so that it is less than one-half to one-fourth of the distance between adjacent droplets in the ink jet from one nozzle 3.

Ink particles not used for printing are charged by a charging electrode plate provided at the ink jet separating position. Voltages are applied to the electrodes 5 of the electrode plate according to printing signals provided by the printing signal generator 12.

As described above, in the conventional ink jet printer, all of the charging electrodes 5 are provided in a single charging electrode plate 4. Therefore, if an ink jet is separated into ink particles at a position which is shifted from the charging electrode position, for some reason such as a nozzle being dirty, then the particles are not charged irrespective of the presence or absence of the printing signal. Accordingly, all the ink particles then move straight towards the recording medium 9 resulting in the recording of noise.

This difficulty may be alleviated somewhat by increasing the thickness of the charging electrode plate 4. However, the diameter of each charging electrode 5 is very small, about 0.3 mm. Therefore, as the thickness of the electrode plate 4 is increased, it becomes difficult to align the ink jets with the charging electrodes so each of the ink jets is directed through the corresponding charging electrode 5.

Accordingly, an object of the invention is to provide an ink jet printer in which the particles which are separated from an ink jet at a position shifted from the charging electrode position are charged at all times thereby to prevent the separated ink particles from reaching the recording medium.

SUMMARY OF THE INVENTION

In accordance with this and other objects of the invention, there is provided an ink jet printer including a plurality of nozzles for producing ink jets which separate into ink particles, charging electrodes disposed substantially at the positions at which the ink jets ordinarily are designed to separate for controlling the charging of the ink particles according to a printing signal, deflecting electrodes for deflecting charged ink particles towards a gutter, at least one set of auxiliary charging electrodes disposed adjacent the charging electrodes for charging ink particles separated at positions shifted from the positions of the charging electrodes, and means for continuously applying a predetermined voltage to the auxiliary charging electrodes. In one embodiment, the auxiliary charging electrodes are provided as two sets of electrodes disposed upon either side of the charging electrodes. If desired, only one set of auxiliary charging electrodes can be used. In another embodiment, the auxiliary charging electrodes are provided as plates extending longitudinally with respect to the ink jets from a position near the nozzles past the charging electrodes.

DESCRIPTION OF THE PREFERRED EMBODIMENTS

Figure 1:
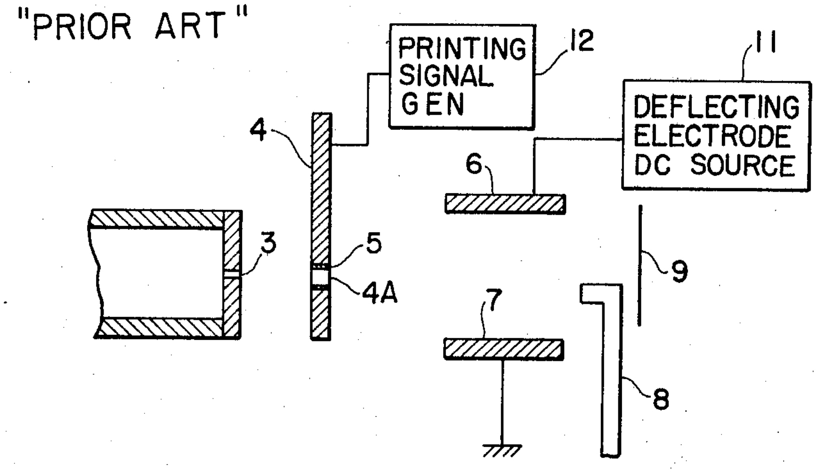
FIG. 1 is a sectional view of a conventional ink jet printer.
Figure 2:
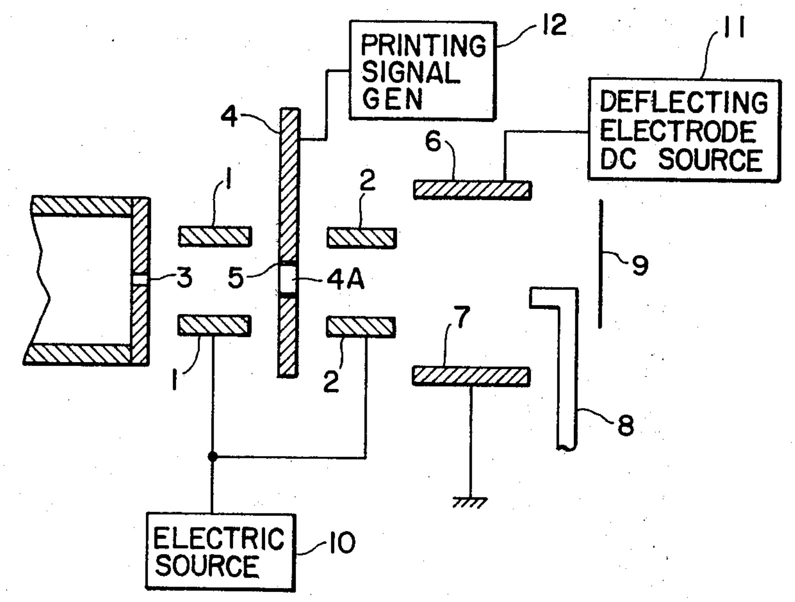
FIG. 2 is a sectional view of a first embodiment of an ink jet printer constructed according to the invention.
Figure 3:
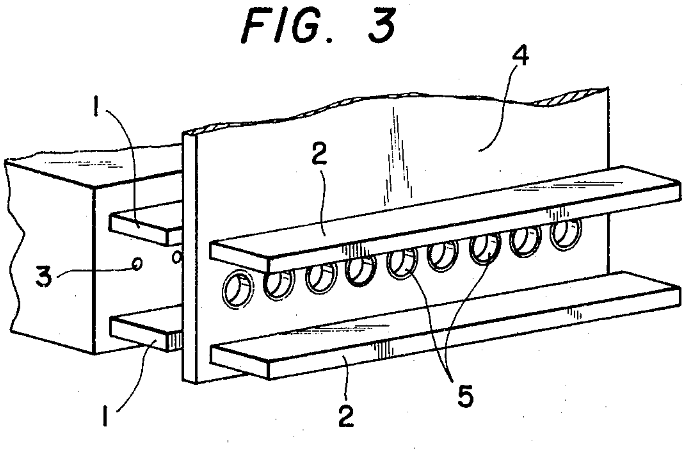
FIG. 3 is a perspective view showing essential components of the ink jet printer of FIG. 2.

FIG. 2 is a sectional view showing an example of an ink jet printer constructed according to the invention and FIG. 3 is a perspective view showing essential components of the ink jet printer shown in FIG. 2. In FIGS. 2 and 3, those components which have been previously described with reference to FIG. 1 are similarly designated. In accordance with the invention, auxiliary charging electrodes 1 and 2 common to each ink jet are provided on either side of the charging electrode plate 4 and a charging DC voltage is continuously applied to the electrodes 1 and 2 by an electric source 10.

Ink particles separated at the position of the charging electrode plate 4 are charged by the charging signal which is applied to the charging electrodes 5 by the printing signal generator 12. On the other hand, ink particles separated at positions shifted from the charging electrodes 5 such as between the charging electrode plate 4 and the nozzles 3 or between the charging electrode plate 4 and the deflecting electrodes 6 and 7 are charged by the auxiliary charging electrodes 1 and 2 irrespective of the presence or absence of the printing signal. Therefore, the ink particles which are deflected while passing through the deflecting field are collected by the gutter 8 so that such ink particles will not reach the recording medium 9.

Figure 4:
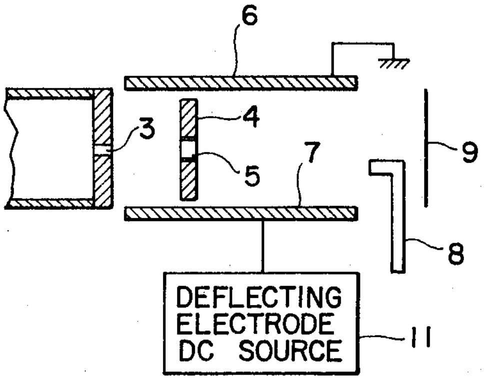
FIG. 4 is a sectional view showing essential components of a second embodiment of an ink jet printer constructed according to the invention.

FIG. 4 is a sectional view showing essential components of another example of the ink jet printer constructed according to the invention. In this embodiment, the upper and lower deflecting electrodes 6 and 7 extend to positions near the orifice panel and the charging electrode plate 4 is disposed in the deflecting field between the two electrodes 6 and 7. In this arrangement, the inside of each charging electrode 5 is shielded from the deflecting field so that ink particles separated thereat are charged only by the printing signal which is applied to the charging electrodes 5. Accordingly, ink particles used for printing move straightly toward the recording medium 9 without being charged while ink particles not used for printing are deflected toward the gutter 8 and are recovered thereby. On the other hand, ink particles separated at positions shifted from the charging electrodes 5 are always charged by the action of the deflecting field and are deflected toward the gutter 8 by the deflecting field behind the charging electrodes so as to be recovered in the gutter 8.

In the above-described embodiments of an ink jet printer of the invention, auxiliary charging electrodes are provided on both sides of the ink jets. However, one of the auxiliary charging electrodes can be eliminated if desired.

As is apparent from the description above, according to the invention, ink particles separated at positions shifted from the positions of the charging electrodes are not used for printing. Therefore noiseless images can be printed utilizing the invention. Thus, according to the invention, pictures having a high signal-to-noise ratio and high quality are reproduced.

What is claimed is:

1. An ink jet printer comprising: a plurality of nozzles for producing ink jets which separate into ink particles; charging electrodes disposed substantially at ink jet separating positions for controlling the charging of said ink particles according to a printing signal; deflecting electrodes for deflecting charged ink drops toward a gutter; at least one set of auxiliary charging electrodes disposed adjacent said charging electrodes for charging ink particles separated at positions shifted from the positions of said charging electrodes; and means for continuously applying a predetermined voltage to said auxiliary charging electrodes.

2. The ink jet printer of claim 1 wherein there are provided two sets of said auxiliary charging electrodes, one set of said auxiliary charging electrodes being disposed adjacent either side of said charging electrodes.

3. An ink jet printer comprising: a plurality of nozzles for producing ink jets which separate into ink particles; charging electrodes disposed substantially at ink jet separating positions for controlling the charging of said ink particles according to a printing signal; a pair of elongated deflection electrodes for deflecting charged ink drops toward a gutter; said deflection electrodes extending parallel to each other and positioned on either side of said charging electrodes, said deflection electrodes extending in a direction of said ink jets continuously from a position near said nozzles past said charging electrodes.

* * * * *